(12) United States Patent
Ghosh et al.

(10) Patent No.: US 8,566,217 B2
(45) Date of Patent: Oct. 22, 2013

(54) APPARATUS AND METHODS FOR FACTS BASED TRADING

(75) Inventors: Debashis Ghosh, Charlotte, NC (US); David Joa, Pacifica, CA (US); Kurt D. Newman, Matthews, NC (US); Thayer Allison, Charlotte, NC (US); Sudeshna Banerjee, Waxhaw, NC (US); Mark Krein, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 696 days.

(21) Appl. No.: 12/236,576

(22) Filed: Sep. 24, 2008

(65) Prior Publication Data

US 2010/0076904 A1   Mar. 25, 2010

(51) Int. Cl.
  *G06Q 40/00* (2012.01)
(52) U.S. Cl.
  USPC ............................................. 705/37; 705/30
(58) Field of Classification Search
  USPC ........................................ 705/36 R, 10–44
  See application file for complete search history.

(56) References Cited

U.S. PATENT DOCUMENTS

| | | | | |
|---|---|---|---|---|
| 7,516,098 | B2* | 4/2009 | Ginsberg | 705/37 |
| 7,725,374 | B2* | 5/2010 | Van Erlach et al. | 705/35 |
| 7,765,138 | B2* | 7/2010 | Loeper | 705/36 R |
| 8,005,749 | B2* | 8/2011 | Ginsberg | 705/37 |
| 8,229,842 | B2* | 7/2012 | O'Connor et al. | 705/37 |
| 2006/0224493 | A1* | 10/2006 | Pinkava | 705/37 |
| 2007/0150396 | A1* | 6/2007 | Rossen et al. | 705/36 R |
| 2009/0006226 | A1* | 1/2009 | Crowder | 705/30 |
| 2009/0281939 | A1* | 11/2009 | Ginsberg | 705/37 |
| 2010/0332412 | A1* | 12/2010 | Park | 705/36 R |
| 2012/0036060 | A1* | 2/2012 | O'Connor et al. | 705/37 |
| 2012/0166326 | A1* | 6/2012 | Sapir et al. | 705/37 |

OTHER PUBLICATIONS

Index_Definition at Dictionary.com, http://dictionary.reference.com/browse/index?s=t.*
"Web Crawler"; http://en.wikipedia.org/wiki/Web_crawler, May 15, 2008.
"Text Mining", http://en.wikipedia.org/wiki/Text_mining, May 15, 2008.
"Reuters NewsScope Sentiment Engine", http://about.reuters.com/productinfo/newsscopesentiment/, May 15, 2008.
"Reuters NewsScope", http://about.reuters.com/productinfo/newsscopearchive/material/NewsScopeBrochure.pdf, May 15, 2008.

(Continued)

*Primary Examiner* — Frantzy Poinvil
(74) *Attorney, Agent, or Firm* — Weiss & Arons LLP; Michael Springs

(57) ABSTRACT

Apparatus and methods for providing a trading recommendation. The apparatus and methods may involve using information about events and reactions to the events. The events and the reactions may be used to identify an expected impact of the event on a market. The expected impact may be used to recommend investment vehicle trades. The methods may include receiving an information item that relates to an event; receiving a sentiment indicator corresponding to the item; assigning to the item a market impact weighting index that is at least partially based on the sentiment indicator; and, based at least partially on the market impact weighting index, selecting the trading recommendation from a database of trading recommendations.

8 Claims, 2 Drawing Sheets

(56) References Cited

OTHER PUBLICATIONS

"Dow Jones Elementized News Feed" http://www.solutions.dowjones.com/product-elementized-news-feed.asp?sect=algo, May 15, 2008.

Bob Giffords "No News is Bad News", The Trade (http://www.cis.upenn.edu/~mkearns/newsalgotrading.pdf), Issue 13, Jul.-Sep. 2007.

"Apama Solutions", http://www.progress.com/apama/index.ssp, May 15, 2008.

Ivy Schmerken "Trading off the News", http://www.wallstreetandtech.com/technology-risk-management/index.jhtml, Apr. 14, 2006.

"Dow Jones Launches XML Data Feed for Algorithmic Trading", http://finextra.com/fullstory.asp?id=16606, Mar. 6, 2007.

"Reuters Offers Real-Time News for Algorithmic Trading", http://finextra.com/fullstory.asp?id=16254, Dec. 11, 2006.

"RavenPack", http://ravenpack.info/aboutus/index.htm, May 15, 2008.

"Infonic—Information Where You Are", http://www.infonic.com/product_sentiment.php, May 15, 2008.

* cited by examiner

APPARATUS AND METHODS FOR FACTS BASED TRADING

FIELD OF TECHNOLOGY

Aspects of the disclosure relate to providing information to traders. In particular, the disclosure relates to providing algorithm-based trading recommendations.

BACKGROUND

Securities are often traded based on news items and market sentiment relating to the news items. For example, some hedge funds and brokerage houses currently use automated algorithmic trading models that process such news items and market sentiment. Progress Software Corporation offers a tool, under the trade name Progress® Apama®, that is a platform upon which a user builds his own event-driven trading algorithms. The user may add various data feeds, including news feeds.

Both Dow Jones and Reuters offer XML-based low-latency (high-speed) news feed services that are currently being used by hedge funds and investment banks for their algorithmic trading. Some news feed services, like those of Dow Jones and Ravenpack, offer market sentiment indicators. Reuters and Infonic, formerly Corpora, offer a software product for measuring sentiment based on a data feed.

In considering the merits and risks of a prospective trade, it is often useful to compare the prospective trade to other possible trades in comparable markets and/or at comparable times. Therefore, when an algorithm-based trading system provides a recommendation for a trade, it would be useful, before acting on the recommendation, to compare the recommendation to other trading recommendations that have been, or are concurrently being, presented. Known algorithm-based trading systems and services typically do not provide users with tools for identifying or considering such other comparable trading recommendations.

It would be desirable, therefore, to provide apparatus and methods for analyzing trading recommendations.

SUMMARY OF THE INVENTION

It is an object of the invention to provide apparatus and methods for providing a trading recommendation are provided. The methods may include receiving an information item and a sentiment indicator that relate to an event and assigning to the item a market impact weighting index that is at least partially based on the sentiment indicator. Using the market impact weighting index, a trading recommendation may be selected from a database of trading recommendations.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
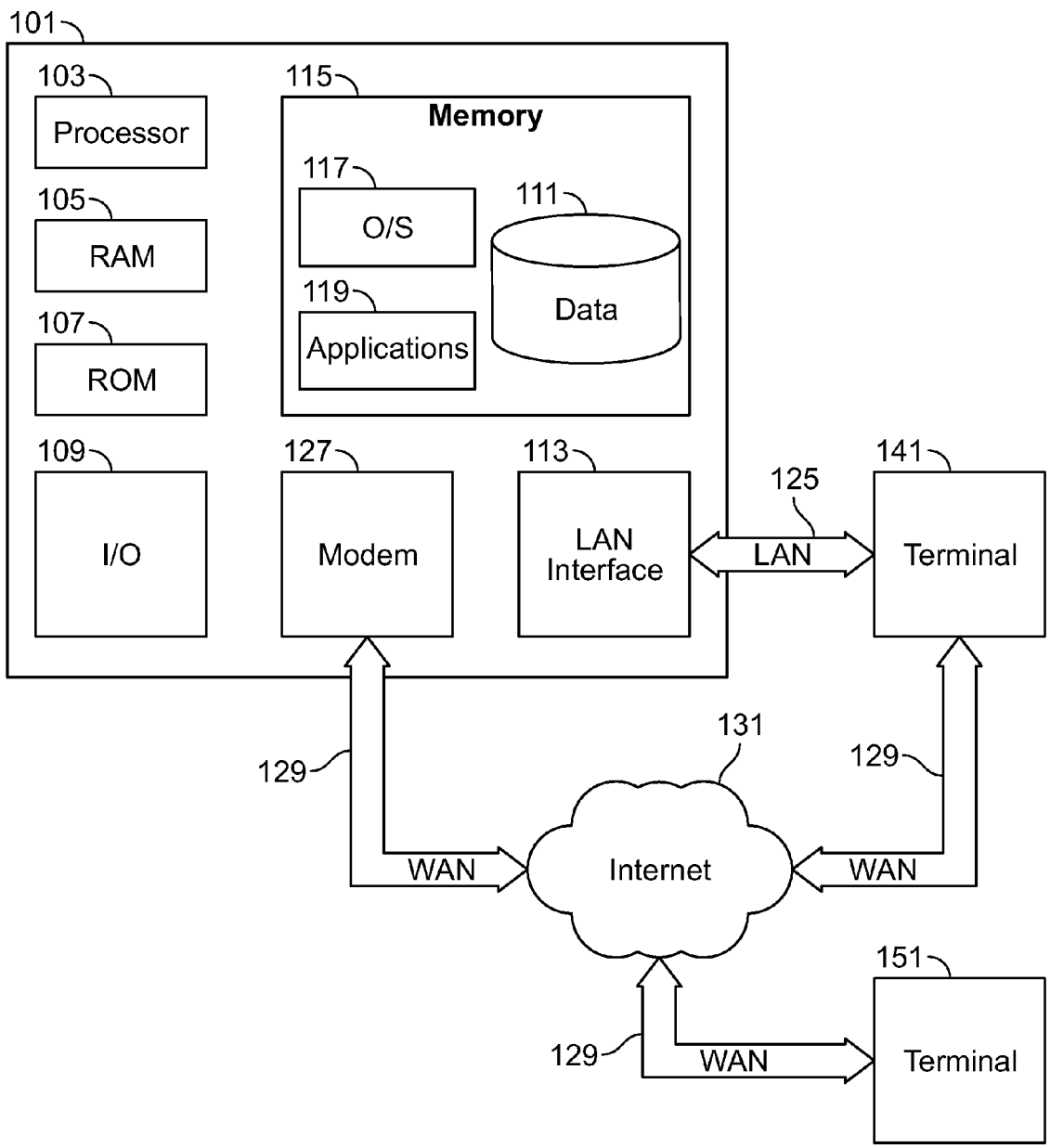
FIG. 1 shows a schematic diagram of apparatus that may be used in connection with the principles of the invention.

Apparatus and methods for providing a trading recommendation are provided. The methods may include receiving an information item that relates to an event; receiving a sentiment indicator corresponding to the item; assigning to the item a market impact weighting index that is at least partially based on the sentiment indicator; and, based at least partially on the market impact weighting index, selecting the trading recommendation from a database of trading recommendations.

In some embodiments, the apparatus and methods may analyze a plurality of information items to identify one or more events and/or sentiments that may affect the value or price of investments.

The market impact weighting index may be based on an impact of an event on one or more of a market, a market sector, a geographic region, a politically defined region, a season, a company, an industry or any other suitable parameter.

The apparatus and methods may search the trading recommendation database to identify an appropriate trading strategy to capture market or stock price movement based on the occurrence of the event.

The trading recommendation may identify a tradable investment vehicle, such as a security. In some embodiments, the trading recommendation may identify an attribute of the investment vehicle, such as a market sector, an industry and an entity. The entity may be a company, a corporation or any other organization having tradable securities.

Apparatus for performing some or all of steps of the methods are provided.

The apparatus and methods may be used to provide a Facts Based Trading System ("FBTS") or a Facts Based Trading Service (also "FBTS," which will be used herein to refer either to the System or the Service). In some embodiments, the FBTS may receive an information item. The information item may relate to the occurrence of an event, market data, one or more news releases, blog content, speculation regarding future events and any other suitable information. The information item may relate directly or indirectly to the value of one or more investment vehicles.

In some embodiments, the FBTS may use text scanning and/or mining software that is tuned to glean from one or more information items an event that could have an impact on one or more financial markets. For example, current news may indicate impending landfall of a powerful hurricane that could adversely affect the Florida citrus crop. The FBTS may scan its database of potential trades related to various events and recommend the purchase of orange juice futures contracts.

Another example is the recommendation of a trade based on public sentiment following the release of a new company product. If the sentiment is negative and the impact deemed significant, the FBTS may recommend the short sale of this company's stock or the purchase of a put option.

The FBTS may receive the information item by scanning the Internet. The FBTS may use web crawler software to download pertinent web pages for later processing. The processing may include using software for text scanning, text mining, language analysis and/or any other suitable software.

The information item may include publicly available information, commercially available information or any other suitable type of information. Examples of commercially available information items include news feeds from Dow Jones and Reuters. Timeliness of trade recommendations based on the information items is important. The FBTS may provide users with an RSS data feed, text messaging and/or emails that give up-to-the-minute information and allow fast action on recommended trades.

The FBTS may analyze the information item based on public sentiment (which itself may be determined using an information item). After analyzing the information item in conjunction with the public sentiment, the FBTS may assign to the information item a market impact index. The market impact index may indicate whether the impact is positive or negative. The index may indicate the speculated intensity of the impact. The FBTS may then select a trading strategy based on the market impact index. The trading strategy may be selected from one or more trading strategies that may be present in a database.

In some embodiments, each trading strategy may include one or more rules. Similar rules may be grouped together in a strategy. For example, the following types of rules may be grouped together in appropriate strategies: aggressive sell-based rules, conservative sell-based rules, conservative buy-based rules, aggressive buy-based rules and any other suitable types of rules. A strategy may be selected based on the intensity of the market impact index. Once a strategy is selected, a rule within the strategy may be selected. Illustrative rules are set forth in Table 1.

TABLE 1

Illustrative Event Categories, Events and Corresponding Illustrative Recommendation Rules

| Illustrative Event Category | Illustrative Event | Illustrative Recommendation Rule |
| --- | --- | --- |
| Weather | Hurricane threatens orange crop in Florida. | Purchase call options on orange juice futures. |
| Infrastructure damage and accidents | Long power outage due to a nuclear reactor accident. | Purchase shares in companies that manufacture emergency electrical generators. |
| Economic announcements | FBTS forecasts, based on received information items, that an unemployment rate will significantly exceed analysts' forecasts. | Purchase shares in a specific company or fund, such as UltraShort S&P500 ProShares. |
| International Events | Major earthquake strikes eastern China, shuts down transportation infrastructure and creates shortages of raw materials for manufacturing. | A) Purchase shares in a specific company or fund, such as ProShares UltraShort China; B) Purchase call options on steel futures. |
| Wars and conflicts | Anticipation of a significant reconstruction effort in a region in connection with approaching resolution of years-long major regional conflict. | A) Purchase shares in international construction companies who most likely would be awarded contracts; B) Purchase calls on concrete futures. |
| Recession related trade recommendations | Anticipation of a pullback in consumer spending. | Short companies that deal with luxury items. |
| Company specific events | Major pharmecuetical company will soon announce the recall of one of its primary products. | Short stock of the pharmaceutical company. |

The FBTS may then formulate a trading recommendation based on the selected rule. The trading recommendation may be based on the information item, the sentiment, the market impact index, attributes of investments related to the information item and/or any other suitable factors.

The FBTS may offer a fee-based trading recommendation service, a data feed trading recommendation service or any other suitable type of service. In the fee-based service, the FBTS may provide a user with a trading recommendation in exchange for a fee. In the data feed service, the FBTS may provide a data feed to the user on a subscription basis. The data feed may be an XML data feed or any other suitable feed. An FBTS XML data feed may allow a user trading platform to automatically trade based on a trading recommendation.

The FBTS may provide a subscriber with a filter that has selectable parameters to control the type of recommendations that are provided to the subscriber.

In some embodiments, the FBTS may include a web site. A user may log into the web site to receive a trade recommendation. The FBTS may charge a subscription fee for access to the secure web site. Trade recommendations available on the web site may be updated in real time. The web site may provide the user with access to a database of trading recommendations. The trading recommendations may be searchable based on one or more of the information item, the sentiment, the news source, the investment vehicle and/or associated attributes, dates and date ranges, and any other suitable parameters. In some embodiments, the database may be searchable using a trading recommendation filter for a selected area of interest, such as recommendations based on weather events, political events or country-specific events.

In some embodiments, the FBTS may provide the user with a tool for tracking performance of a trade after the trade was recommended. The user may be able to view the average performance of certain categories of trade recommendations based on various criteria. For example, the subscriber can choose a specific category of trades (e.g., put options) and a specific event type (e.g., weather related events) to determine, over a specified period, the average return of these past recommendations.

In some embodiments, recommendations are routinely stored. The FBTS therefore "gains experience" over time, because the storage includes more and more trading recommendations. Trade strategies may be stored as they are developed. Ineffective trading recommendations and/or trading strategies may be eliminated or de-prioritized. This means that going forward, FBTS trading recommendations may become increasingly robust.

Apparatus in accordance with the principles of the invention may include one or more of: 1) web crawler software to download the information items; 2) text/language processing software tuned to pinpoint in information items sentiment that may have an impact on a financial market; 3) commercially available news feeds; 4) a database of recommended trades that may be associated with enumerated events; and 5) a data feed generator.

The apparatus and methods may receive the information item from a web crawler application. The information item may then be analyzed using text scanning, text mining and/or language analysis software as well as input from commercially available news data feeds (such as those offered by Dow Jones or Reuters) to isolate specific events or market sentiment that is relevant to the financial markets.

Figure 2:
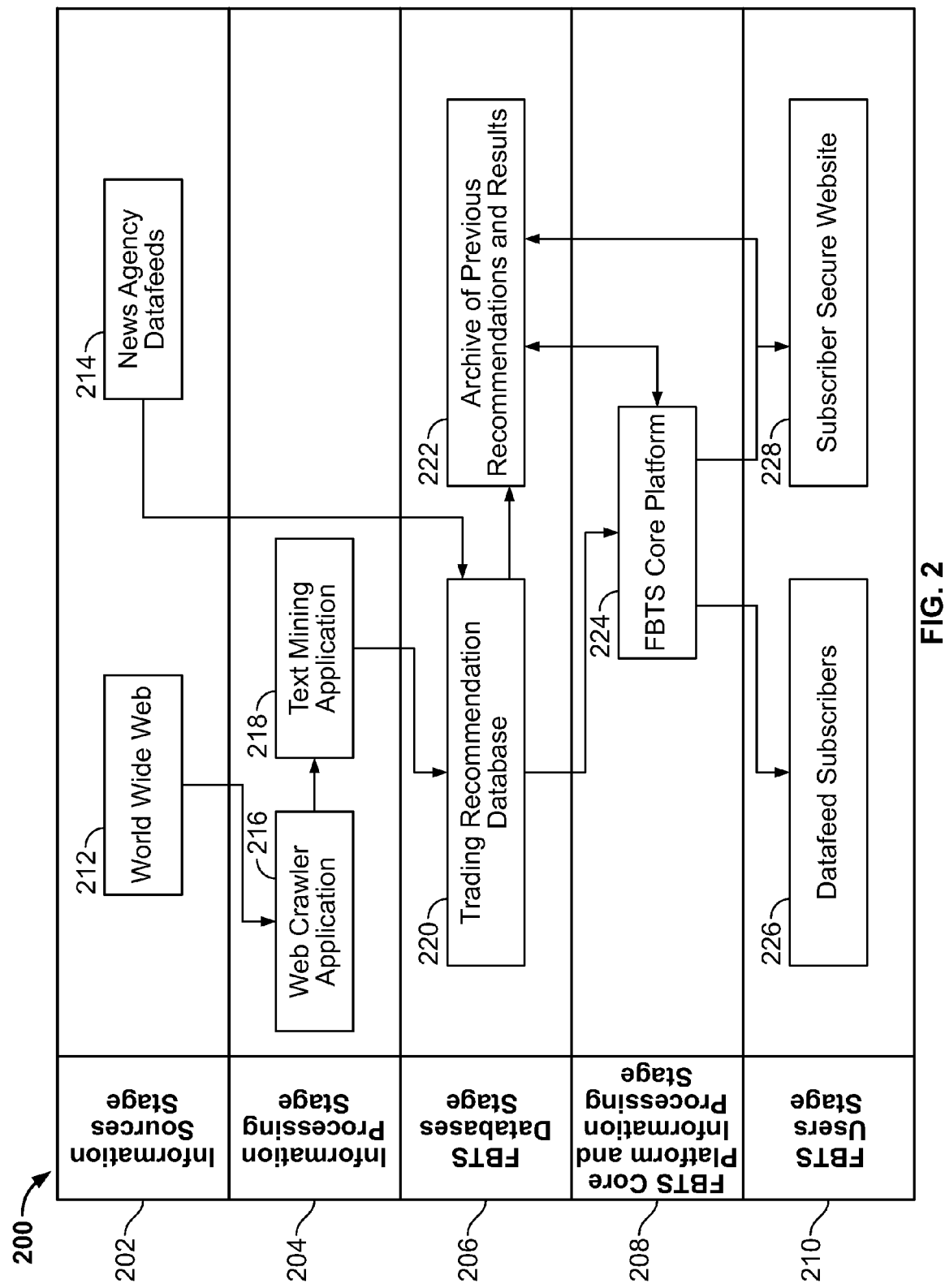
FIG. 2 shows a schematic diagram of data flow in accordance with the principles of the invention.

FIGS. 1 and 2 show illustrative features of apparatus and data flow in accordance with the principles of the invention.

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 is a block diagram that illustrates a generic computing device 101 (alternatively referred to herein as a "server") that may be used according to an illustrative embodiment of the invention. The computer server 101 may have a processor 103 for controlling overall operation of the server and its associated components, including RAM 105, ROM 107, input/output module 109, and memory 125.

Input/output ("I/O") module 109 may include a microphone, keypad, touch screen, and/or stylus through which a user of device 101 may provide input, and may also include one or more of a speaker for providing audio output and a video display device for providing textual, audiovisual and/or graphical output. Software may be stored within memory 125 and/or storage to provide instructions to processor 103 for enabling server 101 to perform various functions. For example, memory 125 may store software used by server 101, such as an operating system 117, application programs 119, and an associated database 121. Alternatively, some or all of server 101 computer executable instructions may be embodied in hardware or firmware (not shown). As described in detail below, database 121 may provide storage for, customer transaction information, customer information and any other suitable information.

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks. When used in a LAN networking environment, computer 101 is connected to LAN 125 through a network interface or adapter 123. When used in a WAN networking environment, server 101 may include a modem 127 or other means for establishing communications over WAN 129, such as Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 119, which may be used by server 101, may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown).

Terminal 151 and/or terminal 141 may be portable devices such as a laptop, a cell phone, a device such one of those sold under the name BLACKBERRY by numerous telecommunication companies in the U.S. and elsewhere, or any other suitable device for storing, transmitting and/or transporting relevant information.

Information items and data extracted from the information items, trading strategies, trading recommendations, subscriber information and any other suitable information may be stored in memory 125.

One or more of applications 119 may include one or more algorithms that may be used to perform web crawling, data mining, data analysis, sentiment analysis, trading strategy archival, selection and retrieval, trading recommendation archival, selection and retrieval, and fulfillment of trading recommendation requirements of users.

The invention may be operational with numerous other general purpose or special purpose computing system environments or configurations. Examples of well known computing systems, environments, and/or configurations that may be suitable for use with the invention include, but are not limited to, personal computers, server computers, hand-held or laptop devices, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

FIG. 2 shows illustrative data flow 200. For the sake of illustration, the data flow illustrated in FIG. 2 will be described as being governed by a "system". The "system" may include one or more of the features of the apparatus shown in FIGS. 1, one or more individuals and/or any other suitable device or approach. The "system" may be provided by an entity. The entity may be an individual, an organization or any other suitable entity.

Information may reside in one or more of the following illustrative stages: information sources stage 202, information processing stage 204, FBTS databases stage 206, FBTS trading core platform and information processing stage 208 and FBTS users stage 210. Information in the stages may include information items, data derived from the information items and other suitable information.

Information may originate in information source stage 202. Information source 202 may include the World Wide Web 212, news agency data feeds 214 and any other suitable information sources. The data feeds may be XML data feeds.

From World Wide Web 212, information may flow to web crawler application 216 in information processing stage 204. Web crawler application may gather the information from World Wide Web 212 using methods for crawling, spidering and/or otherwise gathering information. Information may then flow from web crawler application 216 to text mining application 218. Text mining application 218 may use text mining, or text data mining, methods to extract portions of the information for analysis. The extracted portions may be substantive portions of information relating to events, sentiments and/or other suitable information.

Information from text mining application 218 may be input to trading recommendation database 220. Trading recommendation database 220 may be included in FBTS databases stage 206. Trading recommendation database 220 may include archives of trading recommendations and trading strategies. One or more of the trading recommendations may be based on the occurrence, or likelihood of occurrence, of an event identified in information processing 204. Trading recommendation database 220 may be updated based on the outcomes of trading recommendations that were previously issued.

Information from news agency data feeds 214 may flow to trading recommendation database 220 without first passing through information processing stage 204.

Trading recommendations that are selected from trading recommendation database 220 may be archived in archive of previous recommendations and results 222. Archive of previous recommendations and results 222 may be included in FBTS databases stage 206. Archive of previous recommendations and results 222 may include a database of past recommendations outcome information. The outcome information may relate to the value of an investment vehicle subsequent to the issuance of a trading recommendation about the investment vehicle.

FBTS core platform and information processing stage 208 may include FBTS core platform 224. FBTS core platform 224 may access in trading recommendation database 220 information items from text mining application 218 and trading recommendations that are stored in trading recommendation database 220. FBTS core platform 224 may process output from text mining application 218 and/or news agency data feeds 214 to identify events that could lead to an advantageous trading opportunity.

FBTS core platform 224 may scan records of trade recommendation database 224 and/or archive of previous recommendations and results 222 to identify an appropriate trading strategy and investment vehicle.

Trade recommendations that are selected by FBTS core platform 224 may be stored in archive of previous recommendations and results 222.

FBTS core platform 224 may output recommendations to users in FBTS users stage 210. The users may include data feed subscribers 226. The data feed may be an XML data feed. The data feed may be formatted for automatic or semi-automatic trading on a user trading platform. The user may execute the trades via a third party brokerage firm or any other suitable party.

The users in FBTS users stage 210 may include those that use subscriber secure web site 228. Subscribers may log in to subscriber secure web site 228 to receive trading recommendations, set filter options and review previous recommendations and trade results.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, systems and methods for providing a providing a trading recommendation have been provided. Persons skilled in the art will appreciate that the present invention can be practiced by other than the described embodiments, which are presented for purposes of illustration rather than of limitation. The present invention is limited only by the claims that follow.

What is claimed is:

1. A method for providing a trading recommendation, the method comprising:
    receiving an information item on a computer with a processor and a memory;
    generating a sentiment indicator, by the processor, corresponding to the item;
    assigning, by the processor, to the item a market impact weighting index that is at least partially based on the sentiment indicator;
    identifying, by the processor, a first trading strategy;
    identifying, by the processor, a second trading strategy;
    comparing, by the processor, the first trading strategy to the second trading strategy;
    selecting, by the processor, the one of the first and second trading strategies based on pass outcome associated with one of the first and second trading strategies; and
    based at least partially on the market impact weighting index and the selected trading strategy, selecting, by the processor, the trading recommendation from a database.

2. The method of claim 1 wherein the selecting one of the first and second trading strategies is based on a past outcome that is stored in a database.

3. The method of claim 1 further comprising providing the trading recommendation to a user.

4. The method of claim 3 further comprising storing, by the processor, in an electronic storage a past outcome corresponding to the trading recommendation.

5. One or more non-transitory computer-readable media storing computer-executable instructions which, when executed by a processor on a computer system, perform a method for providing a trading recommendation, the method comprising:
    receiving an information item;

generating a sentiment indicator corresponding to the item;
assigning to the item a market impact weighting index that is at least partially based on the sentiment indicator;
identifying, by the processor, a first trading strategy;
identifying, by the processor, a second trading strategy;
comparing, by the processor, the first trading strategy to the second trading strategy;
selecting, by the processor, the one of the first and second trading strategies based on a past outcome associated with one of the first and second trading strategies; and
based at least partially on the market impact weighting index and the selected trading strategy, selecting the trading recommendation from a trading recommendation database.

6. The media of claim 5 wherein, in the method, the selecting one of the first and second trading strategies is based on a past outcome that is stored in a database.

7. The media of claim 5, wherein the method further comprises providing the trading recommendation to a user.

8. The media of claim 7 wherein the method further comprises storing in an electronic storage a past outcome corresponding to the trading recommendation.

\* \* \* \* \*